United States Patent
Yoshino et al.

(10) Patent No.: US 7,544,436 B2
(45) Date of Patent: Jun. 9, 2009

(54) FUEL CELL

(75) Inventors: Makoto Yoshino, Kawasaki (JP); Seiji Hibino, Kawasaki (JP); Hiroaki Yoshida, Kawasaki (JP); Nawalage Florence Cooray, Kawasaki (JP); Fumio Takei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/854,184

(22) Filed: Sep. 12, 2007

(65) Prior Publication Data

US 2008/0003475 A1    Jan. 3, 2008

Related U.S. Application Data

(63) Continuation of application No. PCT/JP2005/005428, filed on Mar. 24, 2005.

(51) Int. Cl.
*H01M 2/00* (2006.01)
*H01M 2/02* (2006.01)
*H01M 2/14* (2006.01)

(52) U.S. Cl. .......................... 429/38; 429/34
(58) Field of Classification Search ............ 429/34, 429/38
See application file for complete search history.

(56) References Cited

U.S. PATENT DOCUMENTS

2003/0059659 A1   3/2003  Kamo et al.

2004/0209136 A1 *  10/2004  Ren et al. .................. 429/30

FOREIGN PATENT DOCUMENTS

| JP | 2001102069 A | 4/2001 |
| JP | 2001199315 A | 7/2001 |
| JP | 2002289224 A | 10/2002 |
| JP | 2002373677 A | 12/2002 |
| JP | 2003100315 A | 4/2003 |
| JP | 2005032520 A | 2/2005 |

OTHER PUBLICATIONS

International Search Report of PCT/JP2005/005428, date of mailing Jul. 5, 2005.

* cited by examiner

*Primary Examiner*—Patrick Ryan
*Assistant Examiner*—Eugenia Wang
(74) *Attorney, Agent, or Firm*—Westerman, Hattori, Daniels & Adrian, LLP.

(57) ABSTRACT

A direct methanol type fuel cell is provided with a generated gas ejection part having a bundle made up of hollow fiber membranes extending between a fuel electrode and a liquid fuel vaporizing layer that vaporizes a methanol aqueous solution and supplies methanol gas to the fuel electrode. The hollow fiber membranes selectively pass carbon dioxide within a mixture gas that includes methanol, the carbon dioxide generated at the fuel electrode and the like, and eject the carbon dioxide via end portions of the hollow fiber membranes that open at a side surface of the fuel cell via hollow portions. The fuel cell has a high carbon dioxide ejection capability, and suppresses leak of methanol gas. A pressure applying part may be provided to apply a back pressure to the methanol aqueous solution within a fuel storage part, so as to further improve the carbon dioxide ejection capability.

15 Claims, 7 Drawing Sheets

FIG.7A

|  | AVERAGE DISCHARGE VOLTAGE | DISCHARGE TIME |
|---|---|---|
| 1ST CYCLE | 0.20 V | 85 MIN. |
| 2ND CYCLE | 0.20 V | 85 MIN. |
| 3RD CYCLE | 0.19 V | 87 MIN. |

FIG.7B

|  | AVERAGE DISCHARGE VOLTAGE | DISCHARGE TIME |
|---|---|---|
| 1ST CYCLE | 0.20 V | 70 MIN. |
| 2ND CYCLE | 0.19 V | 70 MIN. |
| 3RD CYCLE | 0.19 V | 69 MIN. |

FUEL CELL

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2005/005428 filed Mar. 24, 2005, in the Japanese Patent Office, the disclosure of which is hereby incorporated by reference.

BACKGROUND OF THE INVENTION

1. Field of the Invention

The present invention generally relates to fuel cells, and more particularly to a fuel cell that is compact and has a solid electrolyte layer having proton conductivity.

2. Description of the Related Art

Functions of portable electronic equipments, such as portable telephone sets, portable information terminal equipments, lap-top computers and digital cameras, have diversified, and the power consumption of such portable electronic equipments has increased considerably due to the diversified functions thereof. For this reason, with respect to batteries that are used in the portable electronic equipments, there are demands to realize a high output density and a high energy density.

The batteries that are presently used in the lap-top computers and the portable information terminal equipments do not always satisfy the user's needs, because the driving time per charge is relatively short and the charging time is relatively long. The batteries that are presently used in the portable electronic equipments are lithium-ion secondary batteries. But since it is expected that the energy density required by the portable electronic equipments will become several times the present energy density that is presently required, there are demands to realize a power supply employing a new concept that may replace the lithium-ion secondary battery.

A fuel cell extracts electrical energy from a fuel by causing the oxygen within the air to make an electrochemical reaction with the fuel. The theoretical energy density of the fuel itself in the fuel cell is several times higher than that of the lithium-ion secondary battery. If it is possible to reduce the size of an electrochemical generator part of the fuel cell compared to that of the fuel so as to cause an efficient reaction, there is a possibility of realizing an energy density that is considerably higher than that of the lithium-ion secondary battery. In view of the above, much attention is drawn to the fuel cell that may become the power supply replacing the lithium-ion secondary battery.

The fuel cell types may be categorized into the alkaline, the phosphoric acid, the molten carbonate, the solid oxide electrolyte and the solid polymer electrolyte, depending on the type of electrolyte that is used. With respect to the fuel cell that is used in the portable electronic equipment, there are demands for the fuel cell to have a compact and light structure, to be easy to handle, to be easy to start and stop, and to be resistant against shock and vibration. The solid polymer electrolyte fuel cell is a total solid type which uses a polymer layer as the electrolyte. The solid polymer electrolyte fuel cell has a simple structure, operates even at a relatively low temperature, and can start and stop at a high speed, thereby making the solid polymer electrolyte fuel cell suited for use in the portable electronic equipment. A Direct Methanol Fuel Cell (DMFC) is used particularly in a compact portable electronic apparatus, because of the high energy density of methanol, the ease with which the energy can be accumulated and the simplicity of the cell structure.

In the DMFC, a solid polymer electrolyte layer having proton conductivity is sandwiched between two electrodes, and a methanol aqueous solution is supplied to a fuel electrode. The electrochemical reaction that occurs at the fuel electrode is generated by carbon dioxide, protons and electrons due to the methanol that reacts with water and is oxidized directly at the electrode, as described hereunder. In other words, $CH_3OH+H_2O \rightarrow CO_2+6H^++6e^-$. The protons passes through the solid polymer electrolyte layer and generates water by combining with oxygen at a catalyst layer of an air electrode. In this state, it is possible to obtain and supply the power from the generated electrons to an external circuit by connecting the fuel electrode and the air electrode to the external circuit. The generated water is ejected outside the fuel cell via the air electrode.

In the so-called liquid supply type DMFC, that supplies the methanol aqueous solution directly to the fuel electrode, the methanol concentration gradually decreases within a liquid fuel storage part as the methanol is consumed by the power generation. The power generation stops when the methanol concentration becomes lower than a predetermined concentration, and the methanol included in the methanol aqueous solution is not used up in its entirety.

In order to eliminate this problem, the so-called vapor supply type DMFC, that vaporizes the methanol aqueous solution and supplies the methanol in the vapor state to the catalyst layer of the fuel electrode, has been proposed in a Japanese Laid-Open Patent Application No. 2002-289224, for example. The vapor supply type DMFC can use up the methanol within the liquid fuel in its entirety, because the evaporation of the methanol continues even when the methanol concentration within the liquid fuel storage part becomes lower than a predetermined concentration. In other words, if the volume of the methanol aqueous solution is the same, the vapor supply type DMFC can generate a large amount of power compared to the liquid supply type DMFC.

In the vapor supply type DMFC, carbon dioxide, water and the like are generated by the reaction at the fuel electrode. The pressure at the fuel electrode end increases due to the generated carbon dioxide, and the carbon dioxide blocks a passage of a fuel supply part to cause a reverse flow of the fuel, to thereby result in a state where no fuel is supplied and the reaction stops. For this reason, the carbon dioxide must be ejected outside the fuel cell. On the other hand, the methanol, that is a fuel component, must be kept within the fuel cell to advance the reaction. Hence, it is necessary to efficiently eject only the carbon dioxide, that is an unwanted component, outside the fuel cell.

FIG. 1A is a plan view showing a conventional fuel cell 100, and FIG. 1B is a cross sectional view of the fuel cell 100 shown in FIG. 1A. The fuel cell 100 shown in FIGS. 1A and 1B, that is proposed in the Japanese Laid-Open Patent Application No. 2002-289224, vaporizes a methanol aqueous solution by a fuel holding layer 101, and supplies a methanol gas generated thereby to a fuel electrode 103 that contacts a solid electrolyte layer 102. The reaction described above progresses at a catalyst layer of the fuel electrode 103, and electrons generated by this reaction are obtained via a terminal 104 that contacts the fuel electrode 103. The terminal 104 is provided with a gas emission outlet 105, and a liquid-gas permeation membrane 106 for separating the liquid and gas. The carbon dioxide gas generated at the fuel electrode 103 is ejected outside the fuel cell 100 by the liquid and gas separation of the liquid-gas permeation membrane 106.

The applicants are also aware of a Japanese Laid-Open Patent Application No. 2001-102069.

The Japanese Laid-Open Patent Application No. 2002-289224 discloses that the liquid-gas permeation membrane 106 passes the carbon dioxide, but does not disclose the methanol gas blocking characteristic of the liquid-gas permeation membrane 106. If the liquid-gas permeation membrane 106 does not block the methanol gas, the methanol gas will leak outside the fuel cell, thereby causing the amount of power that is generated to decrease with respect to the amount of methanol supplied. In addition, since the methanol gas is flammable, an excess leak of the methanol gas outside the fuel cell may cause a fire such as ignition and explosion.

SUMMARY OF THE INVENTION

Accordingly, one possible object is to provide a novel and useful fuel cell, in which the problems described above are suppressed.

Another and more specific object is to provide a fuel cell which can simultaneously realize suppression of a fuel gas leak and a high carbon dioxide ejection capability, so as to realize a power generation with a high energy density and a high stability.

Still another object is to provide a fuel cell comprising an air electrode supplied with oxygen gas; a fuel electrode supplied with a fuel gas; a power generation part comprising a solid electrolyte layer that has proton conductivity and is sandwiched between the air electrode and the fuel electrode; a fuel storage part configured to store a liquid fuel; a liquid fuel vaporizing layer configured to vaporize the liquid fuel and to supply the vaporized fuel to the fuel electrode as a gas fuel; and a generated gas ejection part configured to eject a generated gas that is generated by a power generation reaction in the power generation part between the fuel electrode and the liquid fuel vaporizing layer, wherein the generated gas ejection part comprises a hollow fiber membrane, and the hollow fiber membrane ejects the generated gas, that is selectively introduced via a surface thereof, outside the fuel cell.

Other objects and further features will be apparent from the following detailed description when read in conjunction with the accompanying drawings.

BRIEF DESCRIPTION OF THE DRAWINGS

FIG. 7A is a diagram showing a discharge characteristic of an embodiment sample; and FIG. 7B is a diagram showing a discharge characteristic of a comparison sample.

DESCRIPTION OF THE PREFERRED EMBODIMENTS

A description will be given of various embodiments of the present invention, by referring to FIG. 2 and the subsequent drawings.

Figure 2:
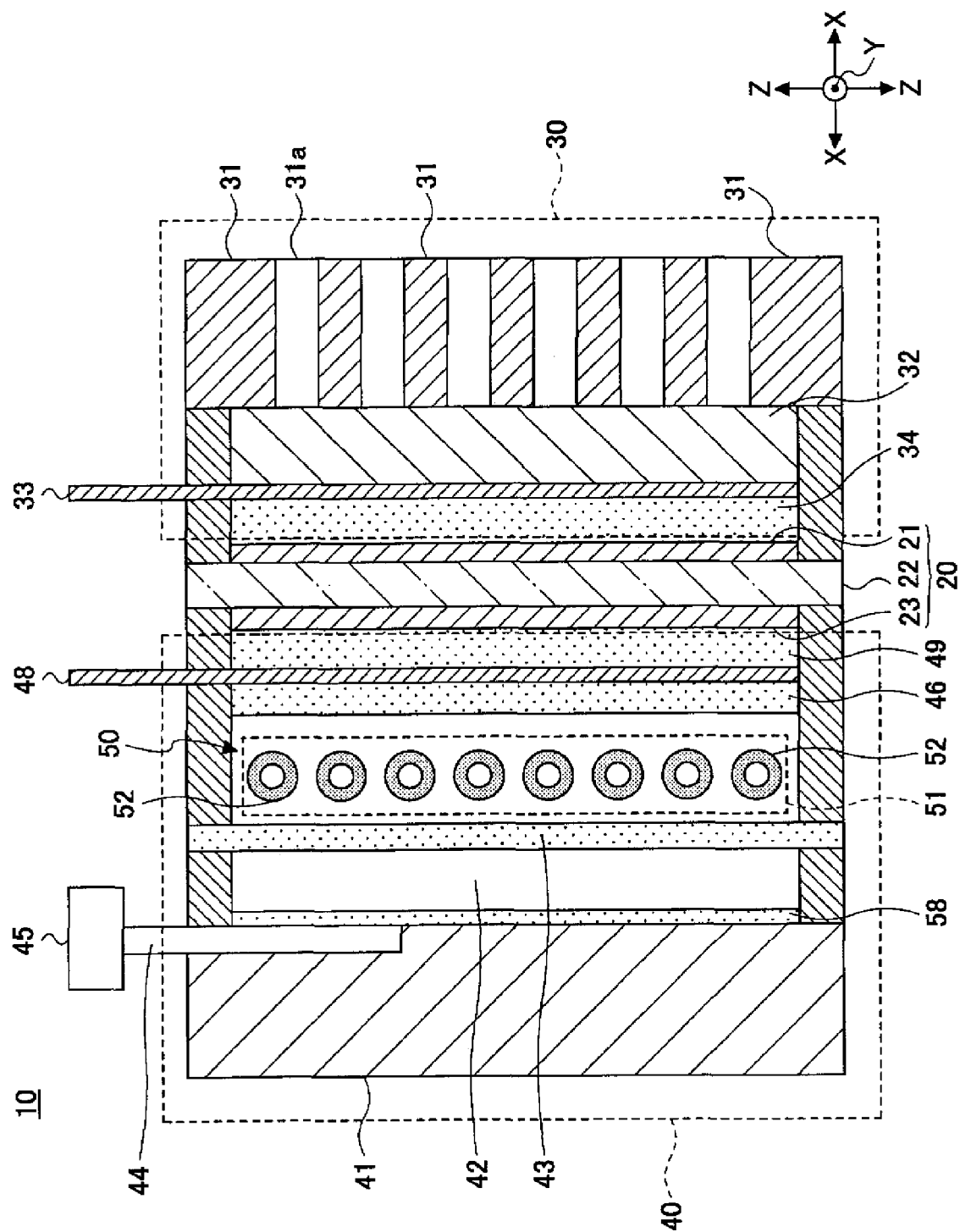
FIG. 2 is a cross sectional view showing a fuel cell of an embodiment of the present invention.
Figure 3:
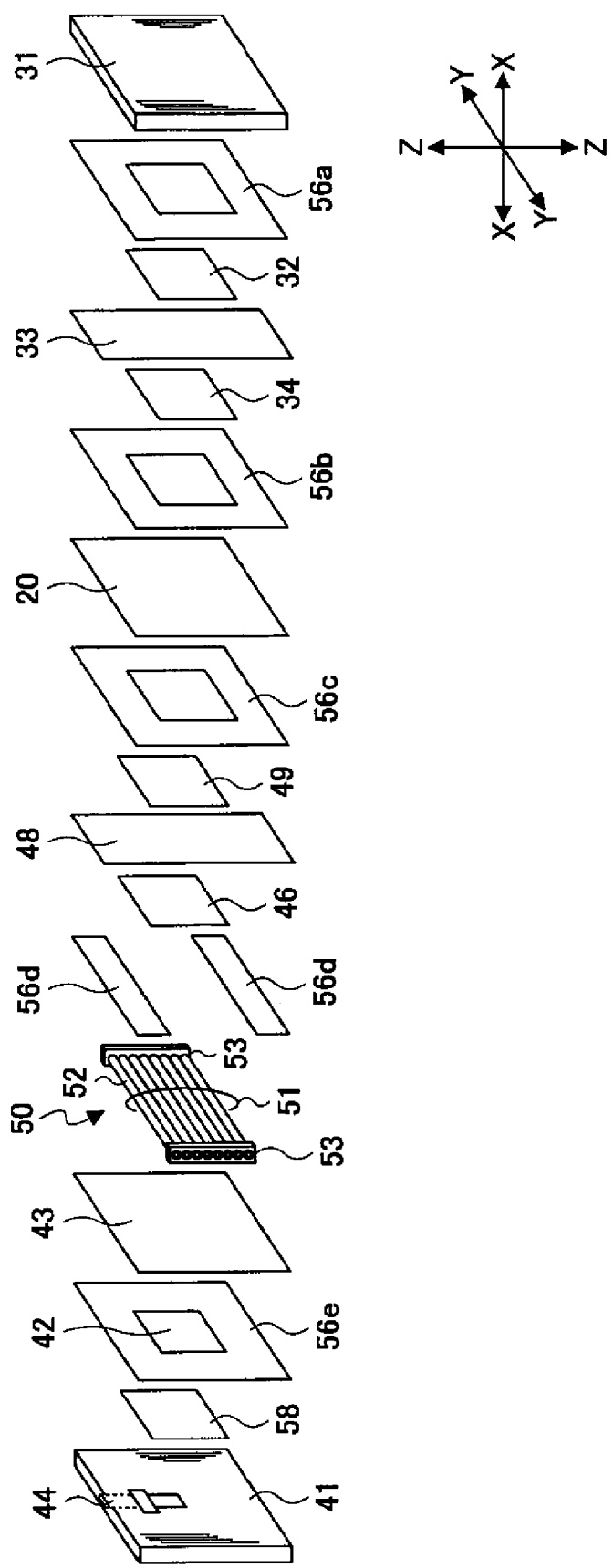
FIG. 3 is a disassembled perspective view showing the fuel cell shown in FIG. 2.

FIG. 2 is a cross sectional view showing a fuel cell of an embodiment of the present invention, and FIG. 3 is a disassembled perspective view showing the fuel cell shown in FIG. 2.

As shown in FIGS. 2 and 3, a fuel cell 10 has a power generation part 20, an air supplying part 30 for supplying oxygen gas to an air electrode 21, and a fuel supplying part 40 for vaporizing a liquid fuel and for supplying a fuel gas such as methanol gas to a fuel electrode 23.

The power generation part 20 is formed by the air electrode 21, a solid electrolyte layer 22 and the fuel electrode 23 that are stacked in this order. Although the illustration of the thin film structure of the air electrode 21 is omitted, the air electrode 21 is formed by a porous carbon paper and a catalyst layer, for example. The catalyst layer is made of platinum (Pt) micro grains or, carbon powder carrying Pt on its surface. The catalyst layer is disposed at a position to contact the solid electrolyte layer 22.

The solid electrolyte layer 22 is made of a polymer solid electrolyte having proton conductivity. Examples of the polymer solid electrolyte include resins having a strong acid group such as the sulfo group and phosphate group, and resins having a weak acid group such as the carboxyl group. For example, Nafion (registered trademark) NF117 (product name by DuPont) or Aciplex (product name of Asahi Kasei Corporation) may be used for the solid electrolyte layer 22.

Although the illustration of the thin film structure of the fuel electrode 23 is omitted, the fuel electrode 23 is formed by a porous carbon paper and a catalyst layer, for example. The catalyst layer is made of platinum-ruthenium (Pt—Ru) alloy micro grains or, carbon powder carrying Pt—Ru alloy on its surface. The catalyst layer is disposed at a position to contact the solid electrolyte layer 22.

In the power generation part 20, the fuel gas is supplied to the fuel electrode 23. Methanol, dimethylether (DME), ethanol or aqueous solutions thereof may be used for the liquid fuel which forms the base of the fuel gas. This embodiment will be described for a case where a mixture solution of methanol and water or, methanol having a 100% concentration (hereinafter simply referred to as a "methanol aqueous solution") is used, for example. At the catalyst layer of the fuel electrode 23, a reaction described by the following reaction formula 1 progresses, the methanol gas and water vapor are consumed, and carbon dioxide gas, protons ($H^+$) and electrons are generated, as well as by-products such as dimethoxymethane and methyl formate. With respect to the dimethoxymethane and methyl formate, an oxidative reaction separate from the reaction formula (1) progresses in the catalyst layer, to thereby generate protons and electrons.

$$CH_3OH+H_2O \rightarrow CO_2+6H^++6e^-$$ (Reaction Formula 1)

The protons conduct through the solid electrolysis layer 22 and reach the air electrode 21. The electrons perform work with respect to an external circuit (not shown) that is connected to the fuel cell 10 as a load, via a fuel electrode gas diffusion layer 49 and a fuel electrode collector 48. Further, the electrons reach the air electrode 21 via an air electrode collector 33 and an air electrode gas diffusion layer 34. At the catalyst layer of the air electrode 21, a reduction reaction described by the following reaction formula 2 progresses, the protons (H$^+$), electrons and oxygen gas are consumed, and water vapor is generated.

$$3/2O_2 + 6H^+ + 6e^- \rightarrow 3H_2O \quad \text{(Reaction Formula 2)}$$

The water vapor is ejected outside the fuel cell 10 via air electrode gas diffusion layers 32 and 34 and oxygen supply ports 31a. The carbon dioxide generated at the fuel electrode 23 is ejected outside the fuel cell 10 by a generated gas ejection part 50 which will be described later. Accordingly, the fuel cell 10 performs the power generation using the methanol as the fuel.

The air supplying part 30 is formed by an air electrode casing 31, the air electrode gas diffusion layers 32 and 34 for diffusing the oxygen introduced via the oxygen supply ports 31a in the air electrode casing 31 and for introducing the oxygen to the air electrode 21, and the air electrode collector 33.

The air electrode casing 31 is made of a metal material or a resin material. The resin material is not limited to a particular resin, but from the point of view of the resistance to alcohol such as methanol, it is preferable that polyolefine resins such as polyethylene and polypropylene, fluororesins such as polytetrafluoroethylene (PTFE) and perfluoroalkoxyethylene (PFA), polyvinylidene-chloride, polybutylenetelephthalate, polyethylenenaphthalate, polyethersulphone, polysulphone, polyphenylene oxide, polyether-etherketone, acryl and the like are used for the resin material.

The air electrode casing 31 has a large number of oxygen supplying ports 31a that penetrate the air electrode casing 31 in a direction taken along a thickness thereof. It is preferable that the oxygen supplying ports 31a are provided in such a manner that the oxygen is uniformly introduced to the entire air electrode gas diffusion layer 32.

The air electrode gas diffusion layer 32 is made of a porous material. The porous material is not limited to a particular porous material, as long as the material is porous. Preferable examples of the porous material include porous ceramics, carbon paper, carbon fiber non-woven fabrics, porous fluororesins, porous polypropylene and the like.

The air electrode collector 33 is conductive, and has a mesh or porous structure. The air electrode collector 33 passes the air or oxygen gas from the air electrode gas diffusion layer 32 towards the air electrode gas diffusion layer 34.

The air electrode collector 33 is preferably made of a metal material having a high corrosion resistance, such as Ni, SUS304 and SUS316, for example. In addition, the air electrode collector 33 may have a structure formed by a metal mesh, expanded metal, metal non-woven fabric, metal foam having a three-dimensional network structure and the like. A metal layer, such as an Au layer, having a high conductivity and a high corrosion resistance, is preferably formed on the surface of the air electrode collector 33. By providing such a metal layer on the surface of the air electrode collector 33, it is possible to improve the corrosion resistance of the air electrode collector 33 and to reduce the contact resistance between the air electrode collector 33 and the air electrode gas diffusion layer 34.

The air electrode gas diffusion layer 34 is made of a conductive porous material. For example, carbon paper, carbon fiber non-woven fiber and the like may be used for the conductive porous material.

In the air supplying part 30, the oxygen gas within the air is introduced via the oxygen supply ports 31a of the air electrode casing 31, and the oxygen gas is diffused via the apertures or micro pores in the air electrode gas diffusion layers 32 and 34, so that the oxygen gas is uniformly introduced to the surface of the air electrode 21. The air electrode gas diffusion layer 32 and/or the air electrode gas diffusion layer 34 may be omitted if it is possible to sufficiently supply the oxygen gas in the diffused state onto the surface of the air electrode 21 without having to provide the air electrode gas diffusion layer 32 and/or the air electrode gas diffusion layer 34.

Sealing members 56a through 56e are made of a resin, such as epoxy resins, olefin resins and fluororesins such as PTFE and PFA, having a superior sealing characteristics or air tightness. The sealing members 56a through 56e prevent the gas, such as the methanol and carbon dioxide, and the liquid, such as the methanol aqueous solution and water, within the fuel cell 10 from leaking outside the fuel cell 10.

The fuel supplying part 40 has a fuel electrode casing 41, a fuel storage part 42 for storing the methanol aqueous solution, a liquid fuel vaporizing layer 43 for vaporizing the methanol within the methanol aqueous solution into methanol gas; fuel electrode gas diffusion layers 46 and 49 for diffusing and introducing the methanol gas to the fuel electrode 23, the fuel electrode collector 48, and the generated gas ejection part 50 that is provided between the liquid fuel vaporizing layer 43 and the fuel electrode gas diffusion layer 46 and ejects the carbon dioxide.

The fuel electrode casing 41 is made of a metal material or a resin material. The resin material is not limited to a particular resin, but from the point of view of the resistance to alcohol such as methanol, it is preferable that polyolefine resins such as polyethylene and polypropylene, fluororesins such as PTFE and PFA, polyvinylidene-chloride, polybutylenetelephthalate, polyethylenenaphthalate, polyethersulphone, polysulphone, polyphenylene oxide, polyether-etherketone, acryl and the like are used for the resin material.

The fuel storage part 42 has a space that is surrounded by the fuel electrode casing 41 (or a porous material layer 58), the liquid fuel vaporizing layer 43 confronting the fuel electrode casing 41, and the sealing member 56e. The fuel storage part 42 stores the methanol aqueous solution that is supplied via a fuel supplying port 44. The methanol aqueous solution that is supplied to the fuel storage part 42 makes direct contact with the surface of the liquid fuel vaporizing layer 43. If the diffusion of the methanol aqueous solution within the liquid fuel vaporizing layer 43 is satisfactory, it is of course possible to provide the fuel storage part 42 so that the methanol aqueous solution makes contact with a portion of the liquid fuel vaporizing layer 43. The porous material layer 58, which has a resistance to alcohol, may be provided between the fuel storage part 42 and the fuel supplying port 44.

As shown in FIG. 2, a pressure applying part 45, that applies a back pressure to the methanol aqueous solution within the fuel storage part 42, may be provided and connected to the fuel supplying port 44. The pressure applying part 45 applies the back pressure to the methanol aqueous solution within the fuel storage part 42 by supplying a gas such as nitrogen gas. By applying the back pressure to the methanol aqueous solution, it is possible to increase the vaporization rate of the methanol at the liquid fuel vaporizing layer 43 which will be described later. Particularly in a case where the liquid fuel vaporizing layer 43 is made of a non-porous material, the vaporization rate of the methanol tends to decrease, but it is possible to increase the vaporization rate instead, even in such a case, by applying the back pressure to the methanol aqueous solution. In addition, by applying the back pressure to the methanol aqueous solution, it is possible to prevent the carbon dioxide that is generated at the fuel electrode 23 from passing through the liquid fuel vaporizing layer 43 and flowing into the fuel storage part 42. Furthermore, it is possible to increase the amount of carbon dioxide that is ejected via a hollow fiber membrane 52 which will be described later. The magnitude of the back pressure is appropriately selected depending on the material used for the liquid fuel vaporizing layer 43, the carbon dioxide ejecting capability of the generated gas ejection part 50 and the like. Preferably, the back pressure is set in a range of 0.01 MPa to 1 MPa.

Although the illustration of a fuel cartridge is omitted, it is possible to provide the fuel cartridge that stores the methanol aqueous solution, and to connect this fuel cartridge to the fuel supplying port 44, so that the methanol aqueous solution is continuously or intermittently supplied to the fuel storage part 42 from the fuel cartridge. In addition, a pressure applying part may be provided on the fuel cartridge, so as to apply a back pressure to the methanol aqueous solution within the fuel cartridge using the gas described above, so that a back pressure is consequently applied to the methanol aqueous solution within the fuel storage part 42. Moreover, a pressure applying part may be provided separately, so as to directly apply a back pressure to the methanol aqueous solution within the fuel storage part 42.

The liquid fuel vaporizing layer 43 is made of a non-porous material or a porous material formed by a polymer having a resistance to alcohol such as methanol. Porous materials suited for use as the liquid fuel vaporizing layer 43 include porous materials made of fluororesins.

From the point of view of sufficiently vaporizing the methanol, the liquid fuel vaporizing layer 43 is preferably made of the non-porous material. This is because, in the case of the non-porous material, the methanol aqueous solution passes through the non-porous material in the vapor phase.

Non-porous materials suited for use as the liquid fuel vaporizing layer 43 include resins having a perfluorosulfonic acid resin as a main component. The perfluorosulfonic acid resin includes a fluororesin as the main chain and the sulfonic acid group as the side chain, for example. For example, Nafion (registered trademark) by DuPont or Aciplex (product name) by Asahi Kasei Corporation may be used for the liquid fuel vaporizing layer 43.

Other non-porous materials suited for use as the liquid fuel vaporizing layer 43 include resins having a perfluorocarbon resin having the carboxyl group as a main component. The perfluorocarbon resin having the carboxyl group has a fluororesin as the main chain and the carboxyl group as the side chain, for example. For example, Flemion (product name) by Asahi Glass Co., Ltd. may be used for the liquid fuel vaporizing layer 43.

Further non-porous materials suited for use as the liquid fuel vaporizing layer 43 include resins including one of polysulfone, polyimide, polyetheretherketone and polyamide as the main component. The non-porous materials suited for use as the liquid fuel vaporizing layer 43 also include polymer materials including silicones, such as silicone rubber.

The fuel gas diffusion layer 46 is made of a porous material having a resistance to alcohol such as methanol. The porous material suited for use as the fuel gas diffusion layer 46 include porous materials such as ceramics, carbon paper, carbon fiber non-woven fabrics, fluororesins, polypropylene and the like. The porosity of the fuel gas diffusion layer 46 is preferably set in a range of 30% to 95%, and more preferably set in a range of 40% to 90%. The mechanical strength of the fuel gas diffusion layer 46 deteriorates if the porosity of the fuel gas diffusion layer 46 exceeds 95%.

The thickness of the fuel gas diffusion layer 46 is not limited to a particular value, but is preferably 1 mm or less. If the thickness of the fuel gas diffusion layer 46 exceeds 1 mm, the thickness of the entire fuel cell 10 becomes excessively large. As described above, it is preferable to provide the fuel gas diffusion layer 46, but the fuel gas diffusion layer 46 is not essential if the fuel gas can be diffused sufficiently without the fuel gas diffusion layer 46.

The fuel electrode collector 48 is made of a material similar to that used for the air electrode collector 33. A metal layer having a high conductivity and a high corrosion resistance, such as an Au layer, is preferably formed on the surface of the fuel electrode collector 48.

The fuel gas diffusion layer 49 is made of a conductive porous material having a resistance to alcohol such as methanol. Examples of the conductive porous material include carbon paper and carbon fiber non-woven fabrics.

In the fuel supplying part 40, the generated gas ejection part 50 is provided between the liquid fuel vaporizing layer 43 and the fuel gas diffusion layer 46. A description will now be given of the generated gas ejection part 50 by referring to FIGS. 2 and 3, and by referring further to FIGS. 4 and 5.

Figure 4:
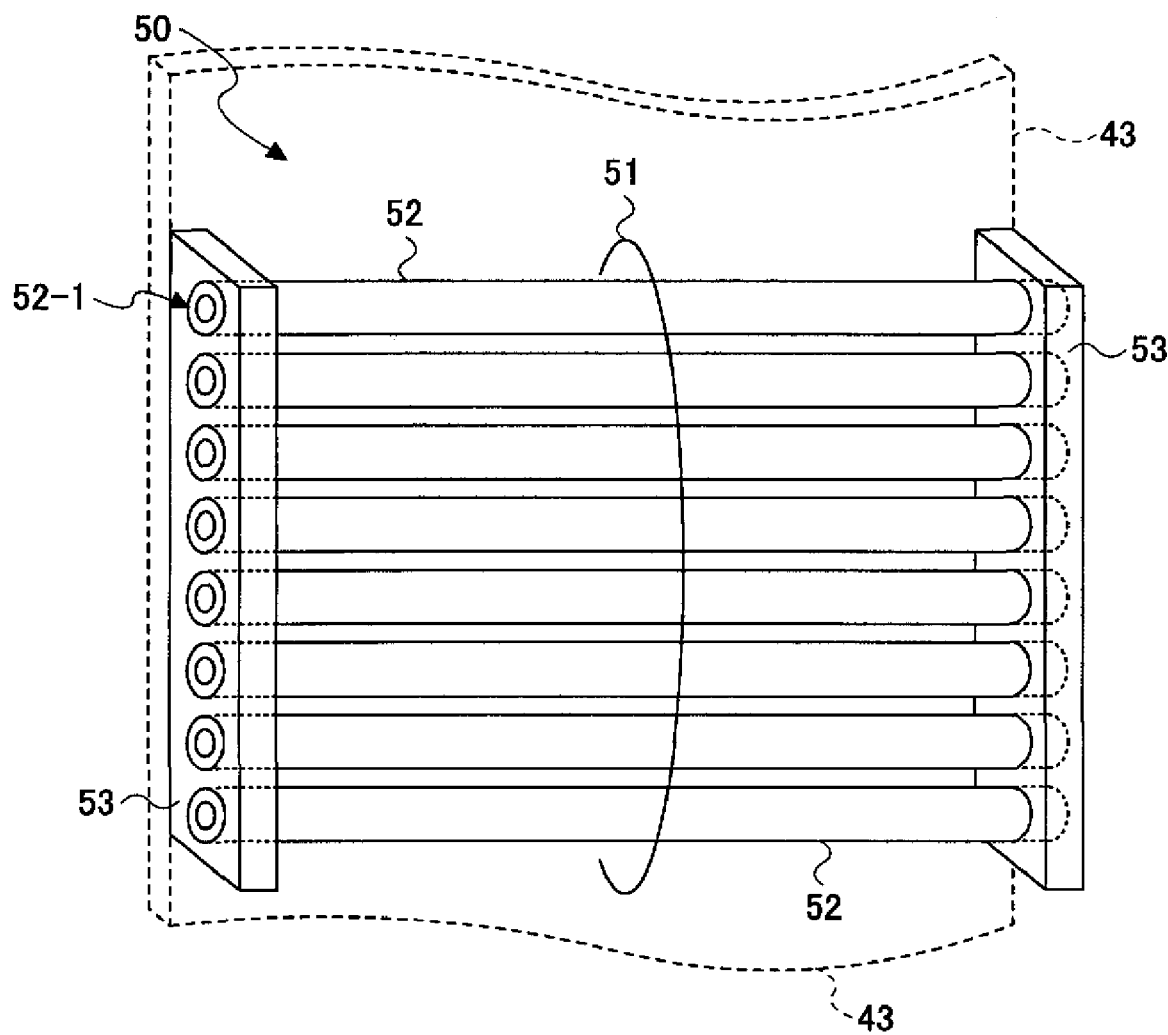
FIG. 4 is a perspective view schematically showing a generated gas ejection part.
Figure 5:
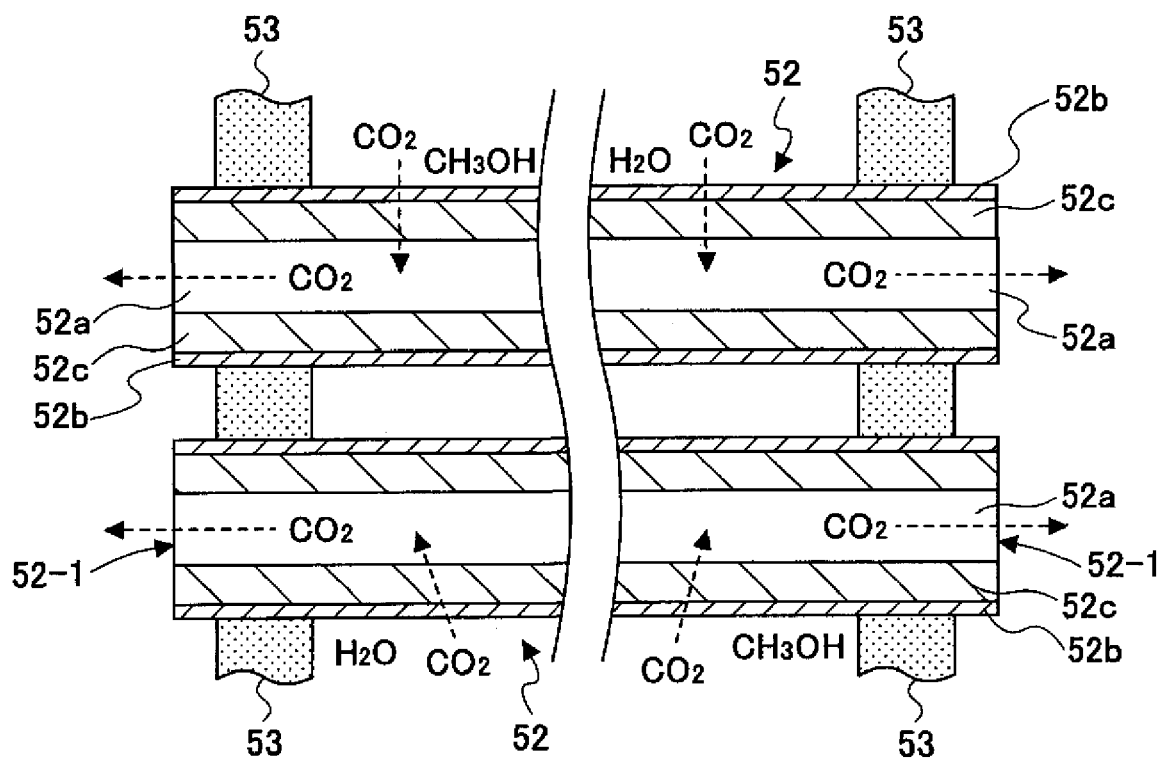
FIG. 5 is a cross sectional view showing an important part of the generated gas ejection part on an enlarge scale.

FIG. 4 is a perspective view schematically showing the generated gas ejection part, and FIG. 5 is a cross sectional view showing an important part of the generated gas ejection part on an enlarge scale.

The generated gas ejection part 50 is formed by a bundle 51 of a plurality of hollow fiber membranes 52 (hereinafter also referred to as "a hollow fiber membrane bundle 51") having gas selectivity, and fixing members 53 for fixing respective end portions 52-1 of the plurality of hollow fiber membranes 52. The hollow fiber membrane bundle 51 is arranged between the liquid fuel vaporizing layer 43 and the fuel gas diffusion layer 46, and is exposed to a mixture gas including high-concentration methanol gas, carbon dioxide, water vapor and by-products of the reaction at the fuel electrode 23.

In addition, the end portions 52-1 at both ends of each of the hollow fiber membranes 52 are exposed to the outside of the fuel cell 10 via the fixing members 53. If the direction in which each of the members forming the fuel cell 10 are stacked is denoted by an X-axis as shown in FIG. 2, the two fixing members 53 are provided on side surfaces of the fuel cell 10, that is, on outer surfaces of the fuel cell 10 perpendicular to a Y-axis direction. The fixing members 53 fix the hollow fiber membranes 52 to each other, and function as sealing members provide a seal so that the mixture gas will not leak outside the fuel cell 10 from between two mutually adjacent hollow fiber membranes 52. The hollow fiber membranes 52 are fixed to each other by the fixing members 53 so that hollow portions 52a of the hollow fiber membranes 52 are not collapsed by the fixing members 53. The hollow portions 52a of the hollow fiber membranes 52 open to the outside of the fuel cell 10. For example, the fixing members 53 are made of a thermoplastic (for example, polyolefine) or a thermosetting resin (for example, epoxy resin).

The hollow fiber membrane 52 is formed by a fiber having a permeation membrane (or separation layer) with a high gas selective permeability, and a core that is hollow. As shown in FIG. 5, for example, the hollow fiber membrane 52 has the hollow portion 52a at the core thereof, a permeation membrane 52b having a high gas selective permeability at the outer surface thereof, and a porous layer 52c having a satisfactory gas permeability at the inner surface thereof. In other words, the hollow fiber membrane 52 is a so-called asymmetric membrane having the outer side and the inner side made of mutually different materials.

The permeation membrane 52b is made of a non-porous vitreous polymer. The vitreous polymers suited for use as the permeation membrane 52b include polysulfone, polyimide, polyamide and mixtures thereof. Such vitreous polymers particularly have a satisfactory resistance to alcohol, and further has a high mechanical strength and a satisfactory thermal characteristic. From the point of view of the resistance to alcohol and the satisfactory gas selective permeability that are obtainable, it is preferable that the softening point of the vitreous polymer is in a range of 150° C. to 420° C.

Since the permeation membrane 52b is non-porous, the permeation membrane 52b has a gas selective permeability depending on the size of the gas molecule. The molecule sizes of the gas included in the mixture gas satisfy a relationship (water vapor)<(carbon dioxide)<(methanol, methyl formate, dimethoxymethane). A larger amount of gases having smaller molecules is passed through the permeation membrane 52b. In other words, because the molecule size of carbon dioxide is smaller than that of methanol, the permeation membrane 52b selectively passes the carbon dioxide but virtually does not pass the methanol. Since the molecule size of the water vapor is smaller than that of the carbon dioxide, the permeation membrane 52b passes the water vapor. The permeation membrane 52b passes more water vapor if the partial pressure of the water vapor is high, that is, the water vapor is supplied in excess. Hence, it is preferable to prevent water condensation by the fuel electrode gas diffusion layers 46 and 49.

The porous layer 52c is made of a porous polymer. The porous layer 52c has a high gas permeation rate because it is porous. The porous layer 52c preferably has a high porosity from the point of view of obtaining a high gas permeation rate, but the function of supporting the hollow fiber membranes 52 deteriorate if the porosity is excessively high. The porous layer 52c may be made of a material similar to that used for the permeation membrane 52b or, made of a material different from that used for the permeation membrane 52b.

The thickness of the permeation membrane 52b of the hollow fiber membrane 52 is preferably in a range of 10 nm to 200 nm, and more preferably in a range of 20 nm to 100 nm. The permeation membrane 52b becomes difficult to make and the gas selective permeability deteriorates if the thickness of the permeation membrane 52b becomes less than 10 nm, and the gas permeation rate deteriorates if the thickness of the permeation membrane 52b exceeds 200 nm.

The thickness of the porous layer 52c of the hollow fiber membrane 52 is preferably in a range of 20 μm to 200 μm, and more preferably in a range of 30 μm to 100 μm. The mechanical strength of the hollow fiber membrane 52 deteriorates if the thickness of the porous layer 52c becomes less than 20 μm, and the permeation resistance of the porous layer 52c increases and the permeation rate decreases if the thickness of the porous layer 52c exceeds 200 μm.

It is preferable that the outer diameter of the hollow fiber membrane 52 is as small as possible, but the outer diameter is preferably 200 μm or greater. This is because the hollow fiber membrane 52 becomes difficult to make if the outer diameter is less than 200 μm. However, the outer diameter may of course be less than 200 μm if the hollow fiber membrane 52 can easily be made. The outer diameter of the hollow fiber membrane 52 is preferably 1000 μm or less, because the effect of increasing the surface area fades if the outer diameter exceeds 1000 μm.

It is preferable that the inner diameter of the hollow fiber membrane 52 (that is, the diameter of the hollow portion 52a) is in a range of 30 μm to 500 μm. This is because the effect of the hollow fiber membrane 52 (that is, the effect of increasing the surface area) deteriorates if the inner diameter of the hollow fiber membrane 52 exceeds 500 μm which thereby causes the outer diameter to increase. On the other hand, the hollow fiber membrane 52 is difficult to make if the inner diameter is less than 30 μm.

The hollow fiber membrane bundle 51 shown in FIG. 4 is made up of 8 hollow fiber membranes 52, but the number of hollow fiber membranes 52 making up the hollow fiber membrane bundle 51 is of course not limited to 8. The number of hollow fiber membranes 52 making up the hollow fiber membrane bundle 51 may be appropriately selected depending on the amount of carbon dioxide generated at the fuel electrode 23. In addition, although the hollow fiber membranes 52 are arranged vertically in one column in FIG. 4, the hollow fiber membranes 52 may be arranged in two or more columns. The density of the hollow fiber membranes 52 forming the hollow fiber membrane bundle 51, that is, the number of hollow fiber membranes 52 per unit area in a cross section taken in a direction perpendicular to a longitudinal direction of the hollow fiber membrane bundle 51, is preferably in a range of 100 membranes/cm$^2$ to 2500 membranes/cm$^2$.

The hollow fiber membrane bundle 51 is preferably made up of the hollow fiber membranes 52 that are bundled approximately parallel to each other. By employing this configuration, it is possible to arrange a large number of hollow fiber membranes 52 per unit volume occupied by the hollow fiber membrane bundle 51, thereby making it possible to simultaneously realize a high carbon dioxide ejection capability and a compact generated gas ejection part 50.

Preferably, a gap is formed between two mutually adjacent hollow fiber membranes 52 of the hollow fiber membrane bundle 51. The provision of this gap enables smooth diffusion of the methanol gas and the carbon dioxide.

The hollow fiber membranes 52 may be bundled in the so-called twill weave state, so that the hollow fiber membranes 52 are arranged to alternately cross at a small angle with respect to an axial direction of the hollow fiber membrane bundle 51. In addition, it is possible to arrange only the end portions of the hollow fiber membranes 52 in the twill weave state, and to bundle the central portions of the hollow fiber membranes 52 approximately parallel to each other. Moreover, the hollow fiber membranes 52 may be bundled in the plain weave state from vertical and horizontal fibers. Although the illustration of the plain weave state will be omitted, a fixing member 53 that fixes the end portion of the hollow fiber membrane 52 corresponding to the vertical fiber may be arranged on the top and bottom surfaces of the fuel cell 10.

For example, UBE N$_2$ separator (nitrogen permeation membrane device by Ube Industries, Ltd.) using polyimide hollow fiber membranes or, SEPAREL (registered trademark, carbon dioxide permeation membrane device by Dainippon Ink and Chemicals, Incorporated) using hollow fiber membranes may be used for the hollow fiber membranes 52. For example, the hollow fiber membrane 52 may be produced by a method proposed in a Japanese Laid-Open Patent Application No. 2002-172311. This proposed-method forms by the so-called dry-and-wet method a polymer mixture solution in which a mixture of two or more kinds of polymers, including at least one kind of the polymer described above, is dissolved in a solvent. More particularly, a hollow fiber structure is formed by extruding the polymer mixture solution from a nozzles the hollow fiber structure is passed through an air or nitrogen atmosphere before being submerged in a coagulation bath, and the phase separation of the two or more kinds of polymers described above is made within the coagulation bath. The hollow fiber structure is thereafter dried, and the solvent is removed, so as to form the hollow fiber membrane.

As described above, in the generated gas ejection part 50, the hollow fiber membrane bundle 51 is arranged between the liquid fuel vaporizing layer 43 and the fuel gas diffusion layer 46, and is exposed to the mixture gas including water, methanol gas and the generated carbon dioxide. Of the mixture gas, the carbon dioxide selectively passes through the permeation membrane 52b of the hollow fiber membrane 52 to reach the hollow portion 52a, and is thereafter ejected outside the fuel cell 10 via the end portions on both ends of the hollow fiber membrane 52.

According to this embodiment, the hollow fiber membrane bundle 51 is arranged between the liquid fuel vaporizing layer 43 and the fuel gas diffusion layer 46 in the generated gas ejection part 50. For this reason, the hollow fiber membrane 52 can increase the surface area that makes direct contact with the mixture gas including the methanol, the carbon dioxide and the like when compared to a sheet-shaped gas permeation membrane, and efficiently eject the carbon dioxide outside the fuel cell 10. In other words, the hollow fiber membrane 52 has a high carbon dioxide ejection capability.

Figure 1A:
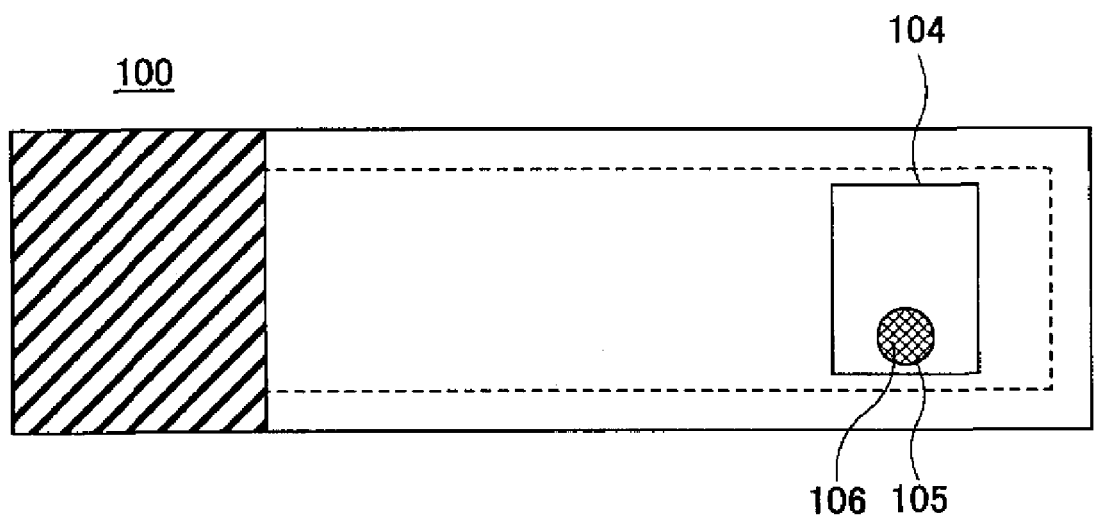
FIG. 1A is a plan view showing a conventional fuel cell.
Figure 1B:
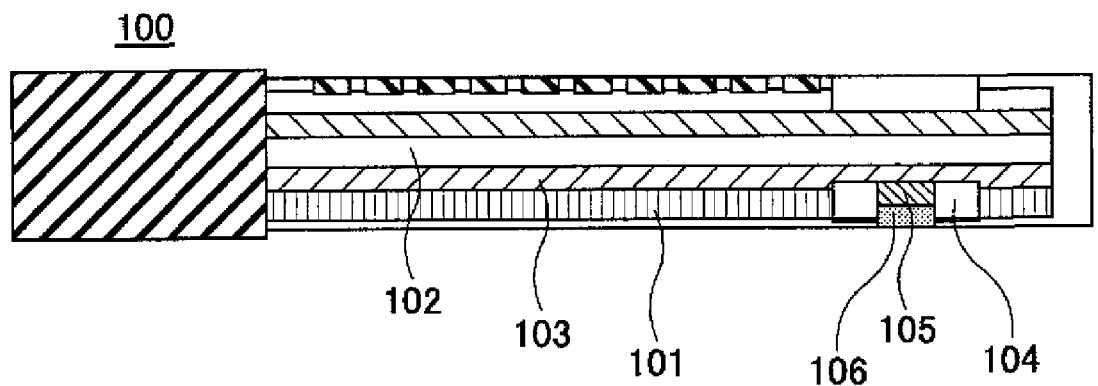
FIG. 1B is a cross sectional view showing the fuel cell shown in FIG. 1A.

As described above in conjunction with FIGS. 1A and 1B, in the conventional generated gas ejection part, the liquid-gas permeation membrane 106 is provided in a region forming a portion of the fuel electrode 103. But in the generated gas ejection part 50 according to this embodiment, the hollow fiber membrane bundle 51 can be arranged within an area that is approximately the same as that of the fuel electrode 23, between the liquid fuel vaporizing layer 43 and the fuel gas diffusion layer 46. For this reason, the generated gas ejection part 50 can increase the surface area making direct contact with the mixture gas, also from this point of view, thereby making it possible to obtain a high carbon dioxide ejection capability.

In addition, because the hollow fiber membrane 52 has a high gas selective permeability, it is possible to greatly suppress the methanol from leaking outside the fuel cell 10. Hence, the fuel cell 10 has a safety, and the energy density can be increased because the amount of methanol that contributes to the power generation increases.

Furthermore, the power generation stability of the fuel cell 10 is highs since it is possible to suppress the pressure increase within the fuel cell 10 caused by the generated carbon dioxide and it is possible to avoid stopping the power generation due to the pressure increase.

The location of the generated gas ejection part 50 is not limited between the liquid fuel vaporizing layer 43 and the fuel gas diffusion layer 46, and the generate gas ejection part 50 may be provided between the liquid fuel vaporizing layer 43 and the fuel electrode 23, as long as the hollow portions 52a are prevented from being closed by collapse or bending of the hollow fiber membranes 52.

Preferably, the permeation membrane 52b and the porous layer 52c of the hollow fiber membrane 52 are clearly separated. However, the boundary between the permeation membrane 52b and the porous layer 52c does not necessarily have to be clear.

The hollow fiber membrane 52 preferably has the permeation membrane 52b arranged on the outer side of the hollow fiber membrane 52, from the point of view of the resistance to alcohol. However, the permeation membrane 52b may be arranged on the inner side of the hollow fiber membrane 52, with the porous layer 52c arranged on the outer side of the hollow fiber membrane 52, and the hollow fiber membrane 52 may have a structure in which the permeation membrane 52b is sandwiched by the porous layers 52c. In this case, the porous layer 52c that is arranged on the outer side of the hollow fiber membrane 52 is preferably made of a material having a satisfactory resistance to alcohol.

The hollow fiber membrane 52 is of course not limited to the asymmetrical layer described above, and may be a gas permeation membrane that has a gas selective permeability with respect to carbon dioxide and methanol. Such a hollow fiber membrane 52 may be formed by a fused fiber made of polyolefine.

As shown in FIG. 2, the longitudinal direction of the hollow fiber membrane bundle 51 of the generated gas ejection part 50 is parallel to the X-axis direction. However, the longitudinal direction of the hollow fiber membrane bundle 51 may be parallel to a Z-axis direction. In other words, the fixing members 53 shown in FIG. 4 may be provided on the side surfaces of the fuel cell 10 perpendicular to the Z-axis direction of the fuel cell 10. It is possible to provide a generated gas ejection part 60 shown in FIG. 6 in place of the generated gas ejection part 50 shown in FIG. 5.

Figure 6:
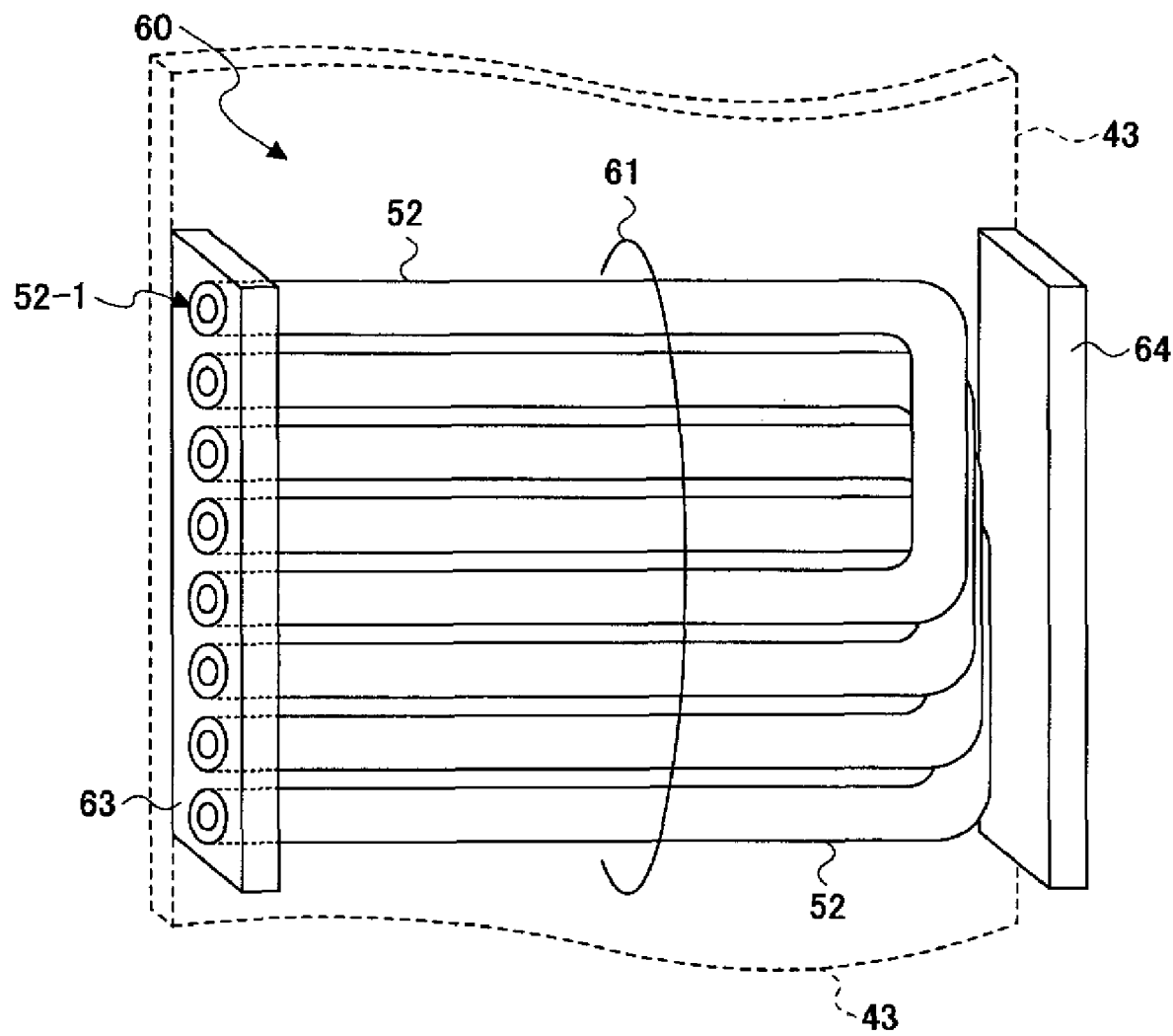
FIG. 6 is a perspective view schematically showing another example of the generated gas ejection part.

FIG. 6 is a perspective view schematically showing another example of the generated gas ejection part. In FIG. 6, those parts that are the same as those corresponding parts in FIG. 4 are designated by the same reference numerals, and a description thereof will be omitted.

As shown in FIG. 6, the generated gas ejection part 60 has a hollow fiber membrane bundle 61 that is formed by a plurality of hollow fiber membranes 52 that are bent in a U-shape, and a single fixing member 63 that fixes both end portions 52-1 of each of the hollow fiber membranes 52. A sealing member 64 having a size similar to that of the fixing member 63 is provided on the side surface of the fuel cell 10 to confront the fixing member 63 that is provided on the opposite side surface of the fuel cell 10.

The hollow fiber membrane bundle 61 extends from the fixing member 63 towards the sealing member 64 along the surface of the liquid fuel vaporizing layer 43, curves in a vicinity of the sealing member 64, and then extends towards the fixing member 63. Hence, both end portions 52-1 of the hollow fiber membrane 52 are exposed at one side surface (the outer surface perpendicular to the Y-axis direction or the Z-axis direction in FIG. 2) of the fuel cell 10. Consequently, it is possible to simplify the structure of the generated gas ejection part 60, and further, to simplify the structure of the fuel cell 10. The fixing member 63 is made of a material similar to that used for the fixing member 53 shown in FIG. 4. In addition, the sealing member 64 is made of a material similar to that used for the sealing members 56a through 56e shown in FIG. 3.

Embodiment Samples

Embodiment samples were made by making fuel cells having the structure shown in FIGS. 2 and 3. The structure of the generated gas ejection part 50 shown in FIG. 4 was employed for the embodiment samples. FIGS. 2 through 4 are referred in the following description.

The power generation part 20 was formed to have a size of 40 mm in length and 40 mm in width. The following materials were used for the embodiment samples.

[Power Generation Part]

Pt—Ru alloy carrying catalyst TEC61E54 (by Tanaka Precious Metals) was used for the catalyst layer of the fuel electrode 23, a Pt carrying catalyst TEC10E50E (by Tanaka Precious Metals) was used for the catalyst layer of the air electrode 21, and a solid electrolyte Nafion (registered trademark) NF117 (product name by DuPont) was used for the solid electrolyte layer 22.

[Air Supplying Part]

Carbon paper (thickness of 280 µm, by Toray Industries, Inc.) was used for the air electrode gas diffusion layers 32 and 34, and meshed SUS304 was used for the air electrode collector 33.

[Fuel Supplying Part]

Silicone rubber (thickness of 50 μm, by Shin-Etsu Chemical Co., Ltd.) was used for the liquid fuel vaporizing layer 43, carbon paper (thickness of 280 μm, by Toray Industries, Inc.) was used for the fuel electrode gas diffusion layers 46 and 49, and meshed SUS304 was used for the fuel electrode collector 48.

[Generated Gas Ejection Part]

70 hollow fiber membranes (outer diameter of 400 μm) of UBE $N_2$ separator (by Ube Industries, Ltd.) were bundled and used for the hollow fiber membrane bundle 51, and the hollow fiber membrane bundle 51 was provided between the liquid fuel evaporating layer 43 and the fuel electrode gas diffusion layer 46. An epoxy resin was used for the fixing members 53, and the area of the fixing members 53 was set to 0.03 $cm^2$. This area of the fixing members 53 refers to an area of the primary surface when the fixing members 53 are viewed in the Y-axis direction, but excluding the area of the portion occupied by the follow fiber membrane bundle 51. An epoxy resin having a satisfactory sealing characteristic was used for the sealing members 56a through 56e.

[Comparison Samples]

Comparison samples were made similarly to the embodiment samples, except that two sheets of carbon paper (thickness of 280 μm, by Toray Industries, Inc.) were used in the generated gas ejection part in place of the hollow fiber membranes so as to cover the fuel electrode gas diffusion layer. Otherwise, the structure of the comparison samples were made the same as that of the embodiment samples. The amount of fuel was set the same for the comparison samples and the embodiment samples.

A continuous discharge characteristic test or experiment was performed under the following conditions.

(1) Methanol having a 100% concentration was used as the liquid fuel, 1 cc of this methanol was supplied to the fuel storage part 42, and a fuel level was confirmed.
(2) Next, nitrogen gas was supplied to the pressure applying part 45, and a back pressure of 0.1 MPa was applied to the methanol within the fuel storage part 42.
(3) Next, a constant current of 60 $mA/cm^2$ was supplied to the fuel cell, so as to discharge the fuel cell.
(4) Next, the discharge was ended after the voltage of the fuel cell rose and then dropped to 0.1 V.
(5) Next, methanol having the concentration of 100% was additionally supplied as the liquid fuel up to the fuel level confirmed by step (1) above.
(6) Next, steps (2) through (5) were regarded as 1 cycle, and two such cycles were repeated thereafter, so as to perform a total of 3 cycles of the continuous discharge characteristic test.

In the continuous discharge characteristic test, the time (discharge time) from the start to the end of the discharge was measured. In addition, the voltage of the fuel cell was measured during the discharge, and the time average of the measured voltage was obtained as the average discharge voltage. It was confirmed at the end of the discharge of each cycle that no methanol remained within the fuel storage part 42 for both the embodiment samples and the comparison samples.

FIG. 7A is a diagram showing a continuous discharge characteristic of the embodiment sample of the fuel cell. FIG. 7B is a diagram showing a continuous discharge characteristic of the comparison sample of the fuel cell.

As may be seen from FIGS. 7A and 7B, the discharge time of each cycle, from the first cycle to the third cycle, is 21% longer for the embodiment sample when compared to the comparison sample. This is because the methanol leaks outside via the carbon paper in the comparison sample of the fuel cell, while in the embodiment sample of the fuel cell, the generated gas ejection part 50 that is provided with the hollow fiber membrane bundle 51 suppresses the methanol leak to the outside, to thereby increase the amount of methanol contributing to the power generation and increase the discharge time. In addition, it was confirmed that the embodiment sample of the fuel cell operates stably and can maintain the discharge characteristic even when the methanol is additionally supplied repeatedly.

Accordingly, it was confirmed that the embodiment sample of the fuel cell has a high capability of ejecting the carbon dioxide outside the fuel cell and has a high fuel utilization efficiency, compared to those of the comparison sample of the fuel cell.

According to the present invention, the generated gas ejection part is provided between the fuel electrode and the liquid fuel vaporizing layer, and the generated gas ejection part has the hollow fiber membrane that ejects the generated gas that is selectively introduced via the surface thereof outside the fuel cell. The generated gas can be selectively and efficiently ejected outside the fuel cell, because the surface area of the hollow fiber membrane making direct contact with the mixture gas that includes the gas fuel and the generated gas can be made large compared to the sheet-shaped gas permeation membrane. Hence, it is possible to simultaneously suppress the leak of the fuel gas and realize a high ejection capability with respect to the generated gas.

In addition, since the leak of the fuel gas is suppressed in the fuel cell according to the present invention, the ratio of the fuel gas contributing to the power generation increases to thereby increase the energy density. Moreover, since it is possible to suppress the pressure increase inside the fuel cell and to avoid the power generation from being stopped by the pressure increase, the fuel cell can generate the power with a high stability.

Further, the present invention is not limited to these embodiments, but various variations and modifications may be made without departing from the scope of the present invention.

As described above, the present invention can simultaneously realize the suppression of the fuel gas leak and the high carbon dioxide ejection capability, and provide a fuel cell that has a high energy density and can make the power generation with high safety.

What is claimed is:

1. A fuel cell comprising:
    an air electrode supplied with oxygen gas;
    a fuel electrode supplied with a fuel gas;
    a power generation part comprising a solid electrolyte layer that has proton conductivity and is sandwiched between the air electrode and the fuel electrode;
    a fuel storage part configured to store a liquid fuel;
    a liquid fuel vaporizing layer configured to vaporize the liquid fuel and to supply the vaporized fuel to the fuel electrode as a gas fuel; and
    a generated gas ejection part configured to eject a generated gas that is generated by a power generation reaction in the power generation part between the fuel electrode and the liquid fuel vaporizing layer,
    wherein the generated gas ejection part comprises a hollow fiber membrane, and
    the hollow fiber membrane ejects the generated gas, that is selectively introduced via a surface thereof, outside the fuel cell.

2. The fuel cell as claimed in claim 1, wherein the generated gas ejection part comprises sealing members configured to fix both end portions of the hollow fiber membrane, and to open the end portions to the outside of the fuel cell.

3. The fuel cell as claimed in claim 1, wherein the hollow fiber membrane extends along a surface of the liquid fuel vaporizing layer that is closer to the fuel electrode.

4. The fuel cell as claimed in claim 1, wherein the generated gas ejection part comprises a bundle made up of a plurality of said hollow fiber membranes.

5. The fuel cell as claimed in claim 4, wherein the sealing members are provided on side surfaces of the fuel cell parallel to a direction in which the liquid fuel vaporizing layer and the fuel electrode are stacked.

6. The fuel cell as claimed in claim 5, wherein the bundle has the plurality of hollow fiber membranes arranged approximately parallel to each other, and each end portion of the plurality of hollow fiber membranes is fixed to a corresponding one of two side surfaces of the fuel cell by one of the sealing members.

7. The fuel cell as claimed in claim 5, wherein each of the plurality of hollow fiber membranes of the bundle has a U-shape, and both end portions of the plurality of hollow fiber membranes are fixed to a corresponding one of two side surfaces of the fuel cell by one of the sealing members.

8. The fuel cell as claimed in claim 4, wherein the bundle has at least a portion of the hollow fiber membranes bundled to a twill weave state of a plain weave state.

9. The fuel cell as claimed in claim 4, wherein the bundle has a number of hollow fiber membranes per unit area in a plane taken in a direction perpendicular to a longitudinal direction of the bundle is in a range of 100 membranes/cm$^2$ to 2500 membranes/cm$^2$.

10. The fuel cell as claimed in claim 1, further comprising:
a pressure applying part configured to apply a pressure with respect to the liquid fuel stored in the fuel storage part.

11. The fuel cell as claimed in claim 1, wherein the liquid fuel vaporizing layer is made of a resin having its main component selected from a group consisting of a perfluorosulfonic acid resin, a perfluorocarbon resin having the carboxyl group, polysulfone, polyimide, polyetheretherketone and polyamide or, is a polymer material including silicone.

12. The fuel cell as claimed in claim 1, wherein the hollow fiber membrane comprises a permeation membrane made of a vitreous polymer selected from the group consisting of polysulfone, polyimide and polyamide.

13. The fuel cell as claimed in claim 12, wherein the hollow fiber membrane further comprises a porous layer made of a porous material, and the permeation membrane is provided on an outer side of the porous layer.

14. The fuel cell as claimed in claim 12, wherein the permeation membrane has a thickness in a range of 10 nm to 200 nm.

15. The fuel cell as claimed in claim 1, wherein the liquid fuel is methanol or, a methanol aqueous solution.

* * * * *